US011367150B2

(12) United States Patent
Lackman et al.

(10) Patent No.: US 11,367,150 B2
(45) Date of Patent: Jun. 21, 2022

(54) DEMOGRAPHIC-BASED TARGETING OF ELECTRONIC MEDIA CONTENT ITEMS

(71) Applicant: Meta Platforms, Inc., Menlo Park, CA (US)

(72) Inventors: Andrew Lackman, Seattle, WA (US); Matthew Jesse Hartgraves, Edmonds, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 445 days.

(21) Appl. No.: 15/413,279

(22) Filed: Jan. 23, 2017

(65) Prior Publication Data
US 2018/0211333 A1   Jul. 26, 2018

(51) Int. Cl.
G06Q 50/00 (2012.01)
G06N 20/00 (2019.01)
G06V 10/44 (2022.01)
G06K 9/62 (2022.01)

(52) U.S. Cl.
CPC ............. G06Q 50/01 (2013.01); G06N 20/00 (2019.01); G06V 10/44 (2022.01); G06K 9/6201 (2013.01)

(58) Field of Classification Search
CPC ........... G06Q 30/0201; G06Q 30/0277; G06Q 30/0242; G06Q 30/02; G06Q 30/0255; G06Q 50/01
See application file for complete search history.

(56) References Cited

U.S. PATENT DOCUMENTS

| 9,070,141 | B2 | 6/2015 | Hua et al. |
| 9,317,812 | B2 | 4/2016 | Kabiljo et al. |
| 9,779,385 | B2 | 10/2017 | Rajaram |
| 10,395,321 | B2 | 8/2019 | Shalita et al. |
| 2008/0313031 | A1* | 12/2008 | Li ..................... G06Q 30/0277 705/14.73 |

(Continued)

OTHER PUBLICATIONS

Tyler, S. K., Pandey, S., Gabrilovich, E., & Josifovski, V. (Oct. 2011). Retrieval models for audience selection in display advertising. In Proceedings of the 20th ACM international conference on Information and knowledge management (pp. 593-598).*

(Continued)

Primary Examiner — Gabrielle A McCormick
Assistant Examiner — Maame Ofori-Awuah
(74) Attorney, Agent, or Firm — BakerHostetler

(57) ABSTRACT

An online system stores user profiles of users performing past user interactions with content items. The system receives a new content item and extracts a new feature vector from an image in the new content item using image analysis. The system generates, by a machine learning model, a demographic criteria vector based on the new feature vector. The machine learning model is configured based on the user profiles of the users performing the past user interactions with the plurality of content items to receive a feature vector for a content item and generate a demographic criteria vector based on the feature vector. The demographic criteria vector indicates a likelihood of a user with a user profile matching the demographic criteria vector interacting with the content item exceeding a threshold. The system sends the demographic criteria vector to a content provider for targeting the new content item.

20 Claims, 5 Drawing Sheets

(56) References Cited

U.S. PATENT DOCUMENTS

| | | | |
|---|---|---|---|
| 2012/0166520 A1* | 6/2012 | Lindsay | G06Q 30/0241 709/203 |
| 2012/0166532 A1 | 6/2012 | Juan et al. | |
| 2012/0331063 A1 | 12/2012 | Rajaram | |
| 2013/0044959 A1* | 2/2013 | Mitchell | G06Q 30/02 382/217 |
| 2013/0218678 A1* | 8/2013 | Benyamin | G06Q 30/0255 705/14.53 |
| 2014/0156360 A1 | 6/2014 | Shalita et al. | |
| 2014/0156566 A1 | 6/2014 | Kabiljo et al. | |
| 2014/0156744 A1 | 6/2014 | Hua et al. | |
| 2014/0286576 A1* | 9/2014 | Nonogaki | G06K 9/00523 382/192 |
| 2015/0019324 A1* | 1/2015 | Schler | G06Q 30/0205 705/14.41 |
| 2015/0065803 A1* | 3/2015 | Douglas | A61B 1/00045 600/200 |
| 2015/0310487 A1* | 10/2015 | Xu | G06F 16/24578 705/14.46 |
| 2016/0140623 A1* | 5/2016 | Gupta | G06Q 30/0269 705/14.66 |
| 2017/0098124 A1* | 4/2017 | Jonsson | G06K 9/6201 |

OTHER PUBLICATIONS

B. Kanagal, A. Ahmed, S. Pandey, V. Josifovski, L. Garcia-Pueyo and J. Yuan, "Focused matrix factorization for audience selection in display advertising,"2013 IEEE 29th International Conference on Data Engineering (ICDE), 2013, pp. 386-397, doi: 10.1109/ICDE. 2013.6544841 (Year: 2013).*

* cited by examiner

DEMOGRAPHIC-BASED TARGETING OF ELECTRONIC MEDIA CONTENT ITEMS

BACKGROUND

This disclosure relates generally to providing electronic media content items to client devices and in particular to demographic-based targeting of electronic media content items presented via client devices to an online audience.

Content provider systems, content publishers, and social networking systems often present content items to users. Such content items are viewed by users on client devices, for example, a laptop or a mobile device. Users typically interact with content items by clicking on them, sharing them with their social networking connections, making financial transactions, etc., on a client device.

A content item may include text, images, audio clips, links, etc. The user experience provided by a content item often depends on what is presented in the content item and also on the profile of the user to which the content item is presented. Conventional techniques for presenting content items target the same content item to a wide social demographic in a manner that sometimes provides poor user experience. Furthermore, sending content items to users that are not interested in the content item results in waste of networking bandwidth and computing resources. Poor user experience leads to fewer user interactions with content items. Fewer user interactions may result in lower user membership of the social network. For example, users may be less likely to engage with an online system if the content items provided by the online system are not of interest to the users.

SUMMARY

An online system uses a machine learning model to determine the best or most effective target audience for a content item, for example, an image or a video, based on an analysis of similar content items (e.g., with similar images). The machine learning model is configured to receive the content item as input and evaluate the likelihood of users with a particular demographic characteristic interacting with the content item responsive to being presented with the content item. The machine leaning model is trained based on features of content items (e.g., extracted features from images) and using information describing past user interactions with the content items presented to users of the online system such that the model can predict the appropriate target audiences for other content items with similar features (e.g., similar images). Examples of user interactions with a content item include, accessing the content item, closing the content item, sharing the content item with other users, and so on. The system then receives a new content item for targeting to an online audience. The system may execute the machine learning model to evaluate various demographic criteria and determines a demographic criteria vector for selecting target users for receiving the new content item.

More specifically, the system receives information describing past user interactions with various content items, such as when the user interacts with the content item, when the user takes an action outside of the system (e.g., on a third party website or mobile application) that relates to the content item, etc. The system identifies one or more demographic criteria from the user profiles of the users who performed these interactions. The system also extracts features from these various content items, such as by performing an image analysis of an image in the content item. The system then trains a machine learning model to recognize similar content items (e.g., similar images) and produce audience demographic criteria based on the image analysis, the profiles of the users who interacted with the content items, and details about the interactions. When the system receives a new content item, the system can then extract features from the new content item and use the machine learning model to predict the right audience for the new content item.

In an embodiment, the system stores user profiles of users performing past user interactions with content items. The system receives a new content item and extracts a new feature vector from an image in the new content item using image analysis. The system generates, by a machine learning model, a demographic criteria vector based on the new feature vector. The machine learning model is configured based on the user profiles of the users performing the past user interactions with the plurality of content items to receive a feature vector for a content item and generate a demographic criteria vector based on the feature vector. The demographic criteria vector indicates a likelihood of a user with a user profile matching the demographic criteria vector interacting with the content item exceeding a threshold. The system sends the demographic criteria vector to a content provider for targeting the new content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Environment

Figure 1:
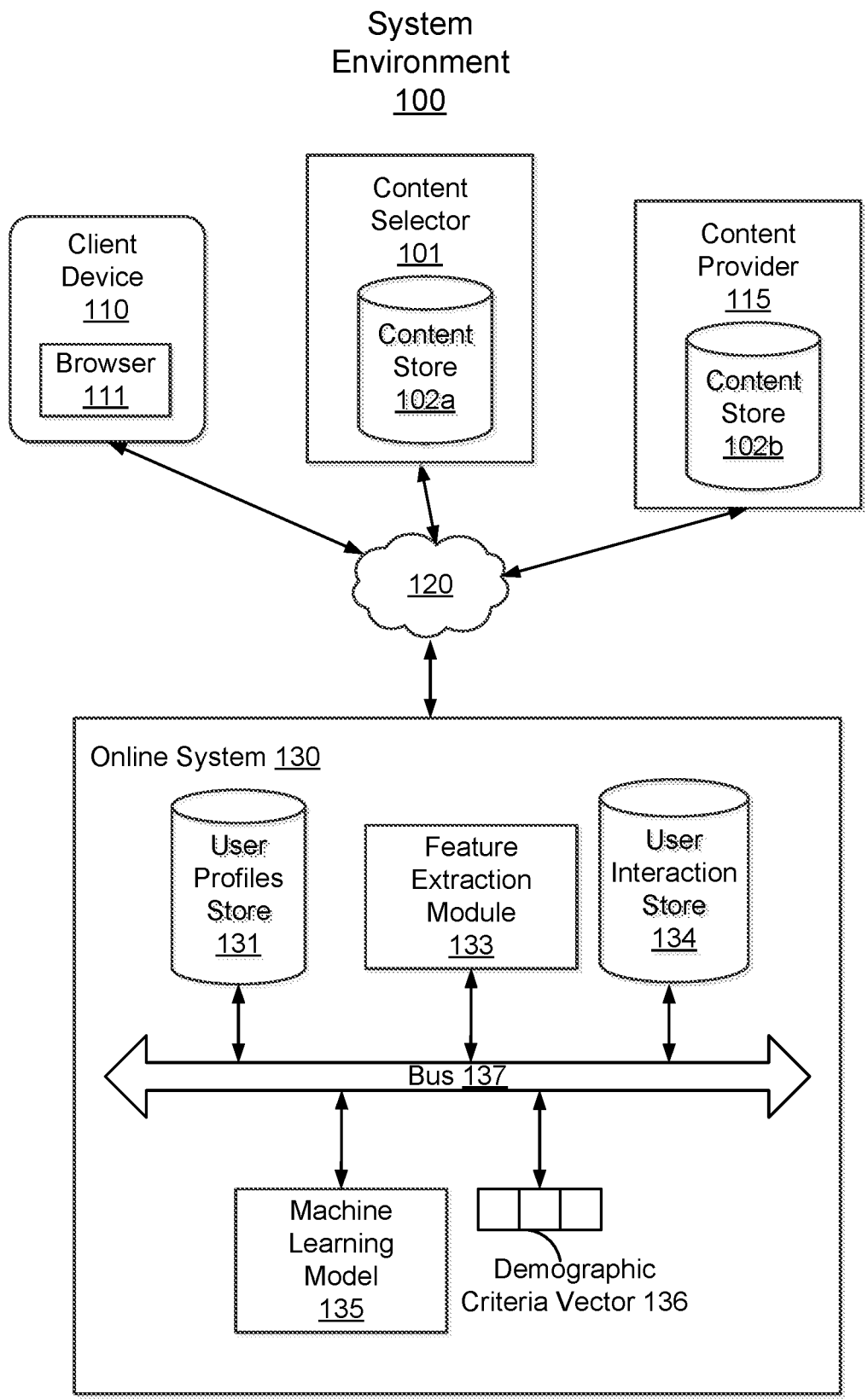
FIG. 1 is a block diagram of a system environment in which an online system operates, in accordance with an embodiment.

FIG. 1 is a block diagram of a system environment 100 in which an online system 130 operates, in accordance with an embodiment. The system environment shown in FIG. 1 includes a content selector 101, a content provider system 115, a client device 110, a network 120, and the online system 130. The term "content item" refers to "electronic media content item" herein. The content selector 101 receives content items from one or more content provider systems 115 and distributes the content items to websites of the online system 130 and third-party websites, such as online newspapers. In some embodiments, the online system 130 instead provides the content selector function, or the content selector 101 is within or controlled by the online system 130. The content provider system 115 may be a provider of sponsored content such as a political campaign, a university, a corporation, the government, etc. Sponsored content includes content items for which the content provider system 115 provides remuneration to the demographic-based content targeting system for targeting and distribution of the content items to an online audience. Examples of sponsored content include online advertisements. The content provider system 115 may include a content store 102b for storing content items.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral, e.g., "102" in the text refers to reference numerals "102a" and/or "102b" in the figures.

In embodiments, the content selector 101 or the online system 130 includes a content store 102a for storing content items. Content items may be images, text paragraphs, video clips, audio clips, hyperlinks, online forms, etc. The content provider system 115 may additionally specify policies with each content item to the content selector 101 regarding targeting of the content item to an online audience. In one example, the content provider system 115 specifies a policy that a particular content item representing a certain cologne should be presented to male users. In another example, the content provider system 115 may specify a policy that a content item containing a rock music audio clip should not be presented to users over 90 years of age. The content selector 101 may send information regarding demographic targeting for content items to content provider systems 115 and online publishers. Examples of online publishers include online newspapers, political websites, university websites, social networking systems, etc.

The online system 130 or third-party websites present content items to the client device 110. The client device 110 shown in FIG. 1 is used for interacting with the online system 130 or with online publishers using the browser 111. The client device 110 is a computing device capable of receiving user input as well as transmitting and/or receiving data via the network 120. In one embodiment, the client device 110 is a conventional computer system, such as a desktop or laptop computer. Alternatively, the client device 110 may be a device having computer functionality, such as a personal digital assistant (PDA), a mobile telephone, a smartphone or another suitable device.

In one embodiment, the client device 110 shown in FIG. 1 executes an application allowing a user to interact with the online system 130. The client device 110 may execute an application, for example, the browser 111, to enable interaction between the client device 110 and the online system 130 via the network 120. In another embodiment, the client device 110 interacts with an online publisher through an application programming interface (API) running on a native operating system of the client device 110, such as IOS® or ANDROID™. A user may download content items from the online system 130 to the client device 110 using browser 111 and interact with the content items by clicking on a link in a content item, filling in user information into an online form, closing the content item using a "close window" button on the browser 111 or on the client device 110, etc.

The content selector 101, the client device 110, and the online system 130 are configured to communicate via the network 120 shown in FIG. 1, which may include any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In one embodiment, the online system 130 shown in FIG. 1 may be a social networking system. The online system 130 may include a user profiles store 131, feature extraction module 133, user interaction store 134, machine learning model 135, and a bus 137. The user profiles store 131 stores user profiles (also referred to herein as social networking profiles) of users of the online system 130, such as demographic information for each user of the online system 130 as well as information about a user's social networking connections. Examples of user profile information include a user's birthdate, gender, education level, etc. The user profiles of users stored by the user profiles store 131 include information entered by a user, such as birthdate, gender, race, etc., as well as information inferred by the online system 130, such as whether a user regularly clicks on online articles from a certain online publisher, whether a user regularly shares content items with his or her social networking connections, etc.

Figure 4:
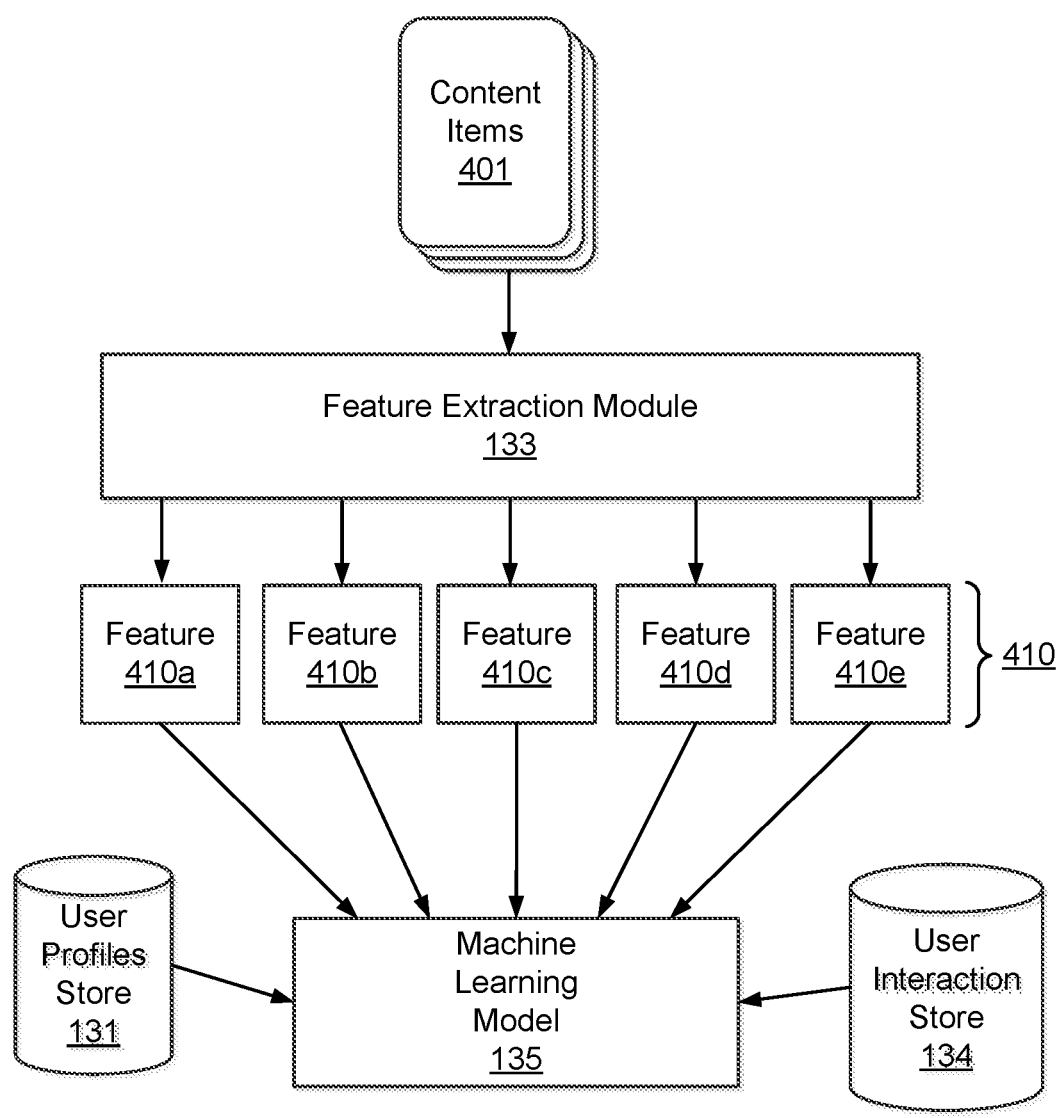
FIG. 4 is an illustration of a process for training a machine learning model, in accordance with an embodiment.

The feature extraction module 133 shown in FIG. 1 extracts a feature vector including features from a content item. The feature vector may include a feature describing an object presented in an image within the content item. Example objects are automobiles, musical instruments, houses, etc. Other example features are a genre of music in an audio clip within a content item, text keywords in a text paragraph within a content item, the values of a pixel attribute such as color of the pixels within a content item, the digital byte values of audio signals within a content item, etc. Example features extracted by the feature extraction module 133 are illustrated in FIG. 4. In one embodiment, the feature extraction module 133 is located on the content selector 101.

The user interaction store 134 receives information describing past user interactions with content items using the client device 110. The user interaction store 134 may include user interactions, such as clicking on a link in a content item, filling in user information into an online form, closing the content item using a "close window" button on the client device, etc. In one embodiment, the past user interactions stored in the user interaction store 134 are used to configure the machine learning model 135 to generate a demographic criteria vector for the new feature vector of a new content item extracted by the feature extraction module 133. In another embodiment, the user interaction store 134 is located on the content selector 101. In embodiments, the feature extraction module 133 may be embedded within the machine learning model 135, such that feature extraction is performed by the machine learning model 135.

The machine learning model 135 shown in FIG. 1 receives as input, a new feature vector for a new content item from the content store 102a. In embodiments, the machine learning model 135 generates a demographic criteria vector based on the new feature vector, such that the demographic criteria vector indicates a likelihood of a user with a user profile matching the demographic criteria vector interacting with the new content item exceeding a threshold. In embodiments, the machine learning model 135 may generate a score for one or more demographic criteria based on the new feature vector for the new content item extracted by the feature extraction module 133. The machine learning model 135 is configured based on the past user interactions and user profiles to generate scores indicative of a likelihood of a user corresponding to the demographic criteria interacting with the new content item. In another embodiment, the machine learning model 135 is located on the content selector 101. The online system 130 generates a demographic criteria vector 136 based on the scores, and sends information describing the generated demographic criteria vector 136 to the content provider system 115 for targeting the new content item to an online audience that is most likely to interact with the new content item. The user profiles store 131, feature extraction module 133, user interaction store 134, and machine learning model 135 are configured to communicate via the bus 137.

The online system 130 as disclosed processes data within a content item into a digital representation of demographic-based online audience preferences. Advantages of the system include providing content to users that are more likely to interact with the content. Other advantages of the system include improving the efficiency of the distribution of content since content not relevant to a user is never transmitted via the network thereby avoiding waste of network bandwidth and computing power.

System Architecture

Figure 2:
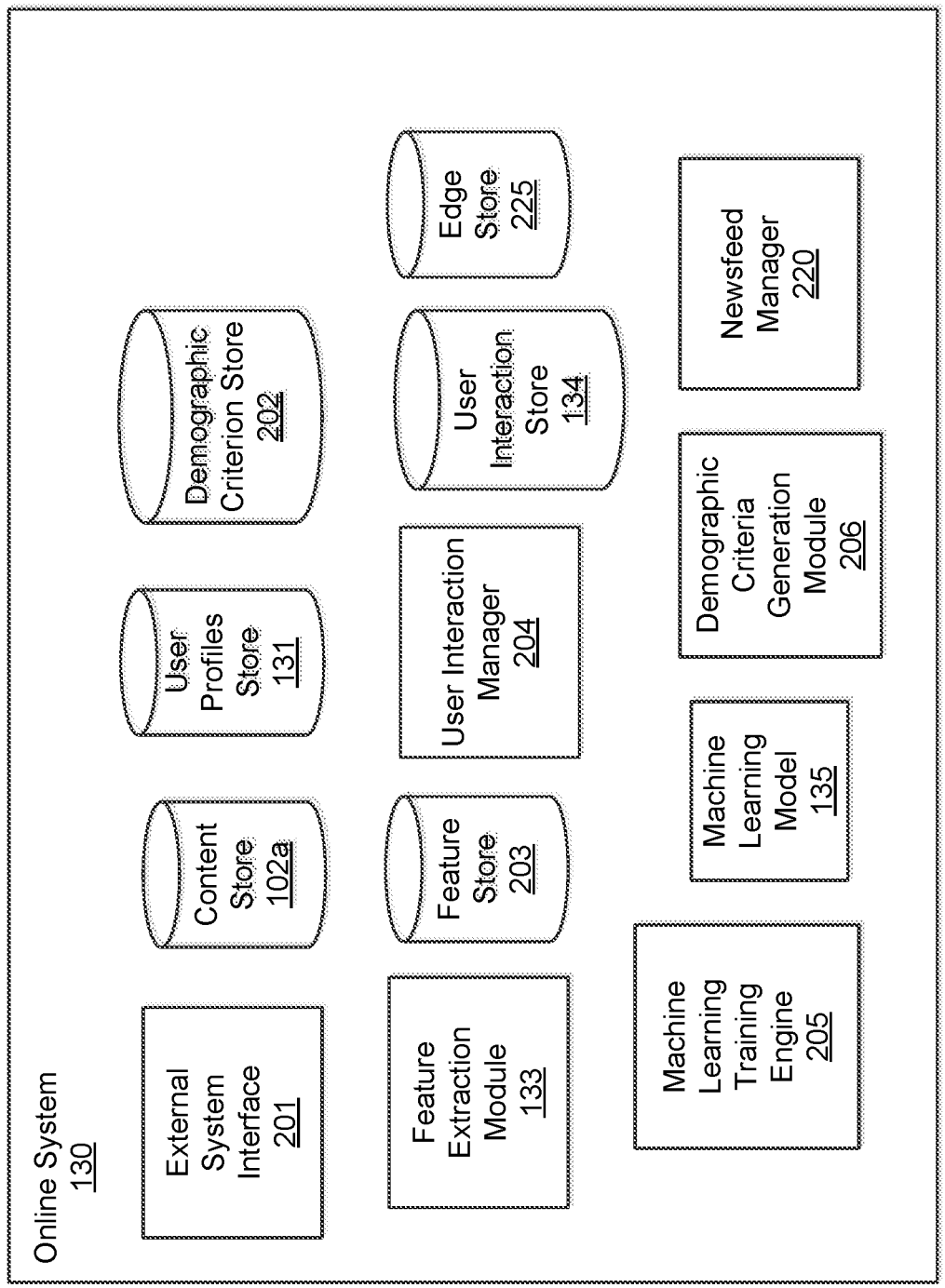
FIG. 2 is a block diagram of a system architecture of the online system, in accordance with an embodiment.

FIG. 2 is a block diagram of a system architecture of an online system 130, in accordance with an embodiment. The architecture of the online system 130 includes an external system interface 201, a content store 102a, a user profiles store 131, an edge store 225, a newsfeed manager 220, a demographic criterion store 202, a feature extraction module 133, a feature store 203, a user interaction manager 204, a user interaction store 134, a machine learning training engine 205, a machine learning model 135, and a demographic criteria generation module 206.

The external system interface 201 shown in FIG. 2 is a dedicated hardware networking device or software module that receives data packets representing content items from a content provider system 115 and data packets representing past user interactions with content items from client devices 110 in response to displaying tracking pixels on websites of the online system 130 or on third-party websites. The external system interface 201 forwards data packets representing content items and tracking pixels to the browsers 111 of client devices 110 and data packets representing the demographic criteria vectors 136 to content provider systems 115. In one embodiment, the external system interface 201 forwards data packets representing a content item from the content selector 101 to the online system 130. In another embodiment, the external system interface 201 forwards data packets representing user profiles from the online system 130 to the content selector 101. In one example, the external system interface 401 forwards data packets at high speed along the optical fiber lines of the Internet backbone. In another example, the external system interface 401 exchanges routing information using the Border Gateway Protocol (BGP) and may be an edge router, a border router, or a core router.

The content store 102a shown in FIG. 2 is used to store content items received from a content provider system 115. The feature extraction module 133 retrieves content items from the content store 102a for processing. A content provider system 115 may additionally specify policies with each content item to the online system 130 regarding targeting of the content item to an online audience. A policy specifies constraints associated with targeting of a content item, for example, constraints that must be satisfied by targeting of a content item and constraints that should not be satisfied by targeting of a content item. In one example, a content provider system 115 specifies a policy that a particular content item representing a cologne for men should be presented to male users. In another example, a content provider system 115 may specify a policy that a content item containing a rock music audio clip should not be presented to users over 90 years of age. The policy may specify a demographic based on the topics described in a content item. For example, a policy may specify that a content item associated with the topic "baby" are to be targeted to male users. Accordingly, the content item is not targeted to female users. The topics of a content item may be specified by the content provider system 115 or extracted by a topic extraction engine of the online system 130 as further described herein. The content store 102a may be organized as a database, table, file, etc., stored on one or more of removable or non-removable memory cards, tape cassettes, zip cassettes, and computer hard drives. In one embodiment, the content store 102a includes multiple data fields, each describing one or more attributes of the content items. In one example, the content store 102a contains, for a single content item, a content provider system 115 identifier, list of topics, whether the content item is provided by the government, etc.

In one embodiment, the online system 130 shown in FIG. 2 includes a topic extraction engine, which identifies one or more topics associated with content items in the content store 102a. To identify topics associated with content items, the topic extraction engine identifies anchor terms included in the text of a content item and determines a meaning of the anchor terms as further described in U.S. application Ser. No. 13/167,701, filed Jun. 24, 2011, which is hereby incorporated by reference in its entirety. For example, the topic extraction engine determines one or more topics associated with a content item maintained in the content store 102a. The one or more topics associated with a content item are stored in the content store 102a. Structured information associated with a content item may also be used to extract a topic associated with the content item.

The user profiles store 131 shown in FIG. 2 stores social networking user profiles of users of the online system 130. The user profiles store 131 may be organized as a database, table, file, etc., stored on one or more of removable or non-removable memory cards, tape cassettes, zip cassettes, and computer hard drives. In one embodiment, the user profiles store 131 includes multiple data fields, each describing one or more attributes of the users. In one example, the user profiles store 131 contains, for a single user, the user name, birthdate, physical location, race, gender, education level, schools attended, place of work, occupation, information about recent online purchases, whether the user regularly clicks on online articles from a certain online publisher, whether the user regularly shares content items with his or her social networking connections, information about the user's connections, etc. The social networking profiles of users stored by the user profiles store 131 include information entered by a user, such as birthdate, gender, etc., as well as information inferred by the online system 130, such as whether the user regularly clicks on online articles from a certain online publisher, whether the user regularly shares content items with his or her social networking connections, information about recent online purchases, etc.

The demographic criterion store 202 shown in FIG. 1 stores demographic criteria of interest in demographic-based content targeting. The demographic criterion store 202 may be organized as a database, table, file, etc., stored on one or more of removable or non-removable memory cards, tape cassettes, zip cassettes, and computer hard drives. Examples of demographic criteria include a range of age of target users, gender of target users, financial status of target users, language associated with target users and so on. Examples of demographic criteria include users older than 50, male users, female users, users located in California, users having a college degree, users who purchased a car within the last three months, users who regularly visit the web site of a certain online publisher, etc.

In an embodiment, the system determines demographic criteria based on aggregate measures of attributes of social networking connections of the user, for example, an average age of connections of the user, an aggregate value representing gender of connections of the user, an aggregate financial status of connections of the user, locations of other users connected to the user, and so on. For example, demographic criteria includes users of the online system that have connections with an aggregate age within a specified range, users that have more than a threshold percentage of connections with a specified gender, users with more than a threshold percentage of connections located within a specified state, users with more than a threshold percentage of connections having more than a threshold education level (for example, a college degree), users connected to other users that performed a particular action within a recent time interval, for example, purchased an item such as a car within the past month, users connected to users who regularly visit the website of a certain online publisher, and so on.

The feature extraction module 133 shown in FIG. 2 extracts a feature vector from a content item. The features may be used by the machine learning model 135 for training as well as for generating the demographic criteria vector 136 for a content item. A feature of the extracted feature vector may describe an object represented in an image in the content item and the feature extraction module 133 may analyze the image to identify the object. For example, the feature extraction module 133 may perform edge analysis in an image in the content item to identify an object represented in the image. The feature extraction module 133 may operate on each pixel location (i, j) in the image. In one example embodiment, S represents an image and M represents a corresponding object image output. The function M(i, j) is defined to be 1 whenever location (i, j) in image S corresponds to an object pixel and 0 otherwise. The feature extraction module 133 may identify points in the image at which a pixel attribute changes sharply. The points at which pixel attributes change sharply may be organized into a set of curved line segments termed edges. The feature extraction module 133 may perform three steps in the edge analysis process to identify edges of an object: filtering, enhancement, and detection. The filtering step reduces noise such as salt and pepper noise, impulse noise and Gaussian noise in the images. The enhancement emphasizes pixels at locations (i, j) where there is a significant change in the pixel attribute value. In one example, the feature extraction module 133 performs enhancement by computing the gradient magnitude of the image at various pixel locations (i, j). The detection searches for pixel locations (i, j) that have a gradient value higher than a threshold to detect edge pixels.

A feature of the extracted feature vector may describe an aggregate value based on a pixel attribute of pixels in the image in the content item and the feature extraction module 133 may analyze the image to determine the aggregate value. For example, the feature extraction module 133 may determine the aggregate value based on using pixel clustering. Within a pixel cluster in the image, adjacent pixels match each other based on a pixel attribute. In one example, for a grayscale image, the pixel attribute is a single number that represents the brightness of the pixel. In this example, the pixel attribute is a byte stored as an 8-bit integer giving a range of possible values from 0 to 255. Zero represents black and 255 represents white. Values in between 0 and 255 make up the different shades of gray. In another example of color images, separate red, green and blue components are specified for each pixel. In this example, the pixel attribute is a vector of three numbers.

The feature extraction module 133 may perform image analysis in the images from the content store 102*a* received via the external system interface 201 by pixel clustering to identify adjacent pixels matching each other based on a pixel attribute, e.g., brightness or color. In one example, the feature extraction module 133 begins by initializing each pixel in an image as a region with the attribute of the pixel. The feature extraction module 133 identifies two adjacent regions having the most similar attribute value. These two regions are merged to form a new region containing all the pixels of the two regions and having the attribute value as the average of the attribute values of the two regions. The feature extraction module 133 repeats the process until there are no similar regions left. The aggregate value determined may be the number of clusters identified, the average values of a pixel attribute across clusters, etc.

Example features extracted by the feature extraction module 133 are described below with reference to FIG. 4. The feature store 203 shown in FIG. 2 is used to store features extracted from content items by the feature extraction module 133. The feature store 203 may be organized as a database, table, file, etc., stored on one or more of removable or non-removable memory cards, tape cassettes, zip cassettes, and computer hard drives. Examples of features include the presence of an object in an image within a content item, text keywords within a content item, audio patterns in an audio clip within a content item, the aggregate value of a pixel attribute such as color of the pixels within a content item, the digital byte values of audio signals within a content item, etc. In embodiments, the feature extraction module 133 may be embedded within the machine learning model 135, such that feature extraction is performed by the machine learning model 135.

The user interaction manager 204 shown in FIG. 2 receives data packets representing past user interactions with content items presented to client devices 110 via the external system interface 201, and populates the user interaction store 134 with information about past user interactions. In one embodiment, the online system 130 includes tracking pixels in the content items presented to client devices 110 such that when a content item is presented via the browser 111 of the client device 110, a particular program or code (or set of instructions) is executed by the browser 111. In this embodiment, this code associated with a tracking pixel causes a browser identifier associated with the user to be sent to the user interaction manager 204. A tracking pixel may be a transparent 1×1 image, an iframe, or other suitable user interface object. The online system 130 may receive information describing the past user interactions with content items from tracking pixels displayed on websites of the online system 130. The online system 130 may receive information describing the past user interactions with content items from tracking pixels displayed on third-party websites.

After a user has clicked on a content item on a website of the online system 130, the user may purchase a product related to the content item on a third-party website or a mobile application, or otherwise interact with a third-party website related to the content item. When the user's client device 110 receives a page from the third-party website, a tracking pixel may fire, causing the browser 111 to send information to the online system 130 about the user interactions performed by the user on the third-party website. The online system 130 may also track such user interactions for content items.

The user interaction manager 204 stores information describing past user interactions in the user interaction store 134. The user interaction store 134 stores the browser identifier associated with the user obtained from the client application, information describing the user interaction performed, and a time stamp value indicating the time at which the user interaction was performed. The online system 130 uses the browser identifier to retrieve the user profile of the user performing the past interaction from the user profiles store 131 for training the machine learning model 135. The user interaction store 134 shown in FIG. 2 may include past user interactions, such as clicking on a link in a content item, filling in user information into an online form, closing the content item using a "close window" button on the client device, sharing a content item by sending it to another user who is connected to the first user's online account, commenting on posts linked to a content item, checking-in to physical locations linked to a content item via a mobile device, joining an event linked to a content item to a calendar, joining a user group linked to a content item, expressing a preference for a content item, e.g., "liking" the content item, engaging in a transaction linked to a content item, etc.

In one embodiment, data from the user interaction store 104 is used to infer interests or preferences of a user, augmenting the interests included in the user profile of the user on the online system 130, and allowing a more complete understanding of user preferences for content items. In another embodiment, a user of the system may interact with content items, and that interaction may be reported to connections of the user in the online system via a "newsfeed" or other mechanism for providing information to users. Users and content items within the online system 130 can be represented as nodes in a social graph that are connected by edges. The edges indicate the relationships between the users, such as a connection within a social network, or the edges represent interactions by users with content items.

In alternative embodiments, a user of the online system may be a software module or application that interacts with the online system 130 via the client device 110 for filtering incoming stories from the newsfeed into folders based on user criteria, detecting computer viruses and spam, prioritizing stories from the newsfeed, automatically interacting with content items, sending user interactions with content items to the online system 130, etc. For example, a client application may use image analysis algorithms to detect skin-tones and specific body shapes normally associated with offensive images and perform a certain user interaction such as closing the content item using a "close window" button on the client device 110. The client application may perform automatic content item filtering on the client device using DNS authentication, automatic sharing of content items with other users, challenge/response functions that send a message to the online system 130 requesting further information related to a content item or story, checksum-based filtering to reduce a portion of the newsfeed to a checksum and look up that checksum up in a database of checksums indicating priorities of content items; statistical (Bayesian) filtering that reflects a user's biases as to content items, etc.

The machine learning training engine 205 shown in FIG. 2 trains the machine learning model 135 using training sets obtained from the user interaction store 134, the feature store 203, and the user profiles store 131. Each training set includes a feature vector for a content item, the past user interactions with the content item, and the profiles of the users who interacted with the content item. In embodiments, the machine learning model 135 is configured to receive a new feature vector for a new content item and generate a demographic criteria vector based on the new feature vector. The demographic criteria vector indicates a likelihood of a user with a user profile matching the demographic criteria vector interacting with the new content item exceeding a threshold. In embodiments, the machine learning model 135 is configured to determine a score based on the new feature vector for each demographic criterion in the demographic criterion store 202. The score for each demographic criterion is indicative of a likelihood of a user corresponding to the demographic criterion interacting with the new content item. The process executed by the machine learning training engine 205 is illustrated and described below with reference to FIG. 4.

In an embodiment, users provide the training sets set by manually identifying content items and demographic criteria that represent high scores and demographic criteria that represent low scores. In another embodiment, the machine learning training engine 205 extracts training sets from past user interactions obtained from the user interaction store 134. The past user interactions represent user interactions that were performed by users responsive to being presented with content items including different types of features. If a past interaction indicates that a user interacted with a content item responsive to being presented with the content item, the machine learning training engine 205 uses the content item as a positive training set. If a stored interaction indicates that a user did not interact with a content item responsive to being presented with the content item, the machine learning training engine 205 uses the content item as a negative training set.

The demographic criteria generation module 206 shown in FIG. 2 may generate a demographic criteria vector 136 representing one or more demographic criteria associated with a new content item and stored in the demographic criterion store 202 for which the score generated by the machine learning model 135 exceeds a threshold. In one embodiment, the online system 130 determines the score for each demographic criterion by evaluating an expression representing a weighted aggregate of scores associated with features. In one example, the weight associated with a feature is predetermined, for example, configured by an expert user. Features that are highly determinative of increased user interactions with the content items are weighted more. In another example, a feature, e.g., that a content item contains an audio clip of rock music, is weighted less responsive to determining that the feature is associated with user interactions indicating users did not send the content item to their social networking connections responsive to interacting with the content item.

The online system 130 shown in FIG. 2 sends information describing the demographic criteria vector 136 to a content provider system 115 for targeting the new content item to an online audience represented by the demographic criteria vector 136 via the external network interface 201. In an embodiment, the content selector 101 embeds a content item into webpages or other media documents of only those client devices 110 of users matching the demographic criteria vector 136. A user matches the demographic criteria vector 136 if the user profile attributes of the user satisfy the criteria specified in the demographic criteria vector 136. For example, the demographic criteria vector 136 may specify a range for age of users. Accordingly, users with age falling within the specified age range satisfy the demographic criterion corresponding to age. In an embodiment, a user fails to match the demographic criteria vector 136 if the user profile attributes of the user fail to satisfy any criteria specified in the demographic criteria vector 136.

In one embodiment, the online system 130 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. A newsfeed manager 220 may generate stories for presentation to a user based on information in the user interaction store 134 and the edge store 225 or may select candidate stories included in the content store 102a. One or more of the candidate stories are selected and presented to a user by the newsfeed manager 220.

For example, the newsfeed manager 220 receives a request to present one or more stories to a social networking user. The newsfeed manager 220 accesses one or more of the user profiles store 131, the content store 102a, the user interaction store 134, and the edge store 225 to retrieve information about the identified user. For example, stories or other data associated with users connected to the identified user are retrieved. The retrieved stories or other data is analyzed by the newsfeed manager 220 to identify content likely to be relevant to the identified user. For example, stories associated with users not connected to the identified user or stories associated with users for which the identified user has less than a threshold affinity are discarded as candidate stories. Based on various criteria, the newsfeed manager 220 selects one or more of the candidate stories for presentation to the identified user.

In various embodiments, the newsfeed manager 220 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profiles store 131. The newsfeed manager 220 may also determine the order in which selected stories are presented via the newsfeed. For example, the newsfeed manager 220 determines that a user has a highest affinity for a specific user and increases the number of stories in the newsfeed associated with the specific user or modifies the positions in the newsfeed where stories associated with the specific user are presented.

The newsfeed manager 220 may also account for actions by a user indicating a preference for types of stories and selects stories having the same, or similar, types for inclusion in the newsfeed. Additionally, the newsfeed manager 220 may analyze stories received by the online system 130 from various users and obtains information about user preferences or actions from the analyzed stories. This information may be used to refine subsequent selection of stories for newsfeeds presented to various users. The online system 130 may process individual stories or a composite newsfeed of stories for targeting to different demographic audiences using the system disclosed herein. The online system 130 may determine suitable demographic criteria for a newsfeed using the disclosed embodiments.

In one embodiment, an edge store 225 stores information describing connections between users and other objects, such as content items, on the online system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with content items in the online system 130, such as expressing interest in a content item on the online system 130, sharing a link with other users of the online system 130, and commenting on a content item posted by other users of the online system 130. Users and objects within the online system 130 can represented as nodes in a social graph that are connected by edges stored in the edge store 225.

In one embodiment, an edge may include various characteristics each representing characteristics of interactions between users, interactions between users and content items, etc. For example, characteristics included in an edge describe rate of interaction between two users, how recently two users have interacted with each other, the rate or amount of information retrieved by one user about a content item, or the number and types of comments posted by a user about a content item. The characteristics may also represent information describing a particular content item or user. For example, a characteristic may represent the level of interest that a user has in a particular topic, the rate at which the user logs into the online system 130, or information describing demographic information about a user. Each characteristic may be associated with a source content item or user, a target content item or user, and a characteristic value. A characteristic may be specified as an expression based on values describing the source content item or user, the target content item or user, or interactions between the source content item or user and target content item or user; hence, an edge may be represented as one or more characteristic expressions.

The edge store 225 also stores information about edges, such as affinity scores for content items, interests, and other users. Affinity scores, or "affinities," may be computed by the online system 130 over time to approximate a user's affinity for a content item, interest, and other users in the online system 130 based on the actions performed by the user. A user's affinity may be computed by the online system 130 over time to approximate a user's affinity for a content item, interest, and other users in the online system 130 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific content item may be stored as a single edge in the edge store 225, in one embodiment. Alternatively, each interaction between a user and a specific content item is stored as a separate edge. In some embodiments, connections between users may be stored in the user profiles store 131, or the user profiles store 131 may access the edge store 225 to determine connections between users.

Overall Process

Figure 3:
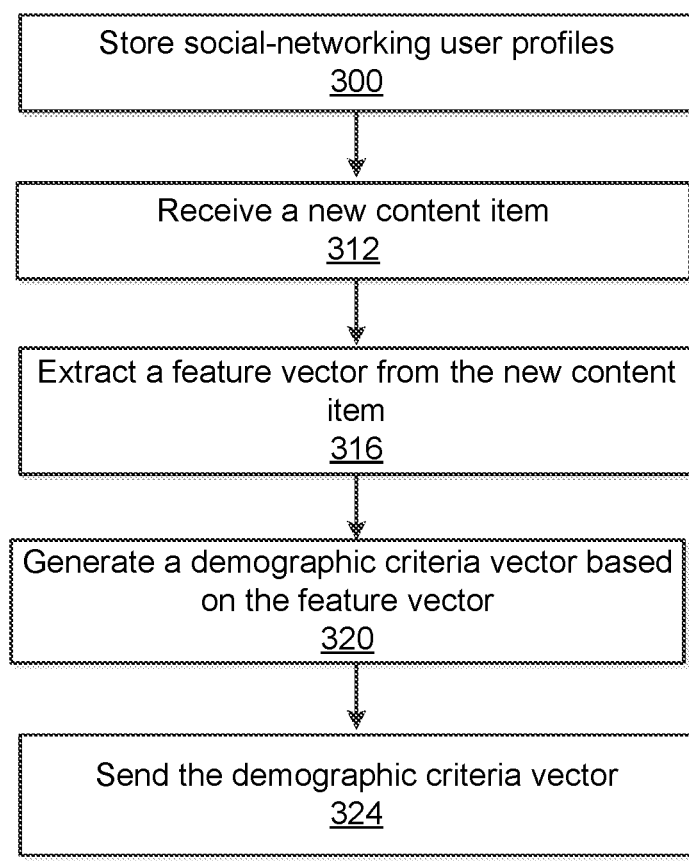
FIG. 3 illustrates the overall process of targeting content items to an online audience, in accordance with an embodiment.

FIG. 3 is a flowchart illustrating the overall process of targeting content items to an online audience, in accordance with an embodiment. In some embodiments, the process may have different and/or additional steps than those described in conjunction with FIG. 3. Steps of the process may be performed in different orders than the order described in conjunction with FIG. 3. Some steps may be executed in parallel. Alternatively, some of the steps may be executed in parallel and some steps executed sequentially. Alternatively, some steps may execute in a pipelined fashion such that execution of a step is started before the execution of a previous step.

The online system 130 stores 300 social networking user profiles of users performing past user interactions with content items on the online system 130 for retrieving demographic criteria and for training the machine learning model 135. In one embodiment, information representing social networking user profiles of users is retrieved by the content selector 101 from the online system 130 via the external network interface 201 for retrieving demographic criteria and for training the machine learning model 135. The user interaction manager 204 receives information from the client devices 110 describing past user interactions with the content items from tracking pixels displayed on websites of the online system or third-party websites accessed by client devices 110. The code associated with a tracking pixel causes a browser identifier associated with the user to be sent to the user interaction manager 204. The user interaction manager 204 receives the browser identifier associated with the user for retrieving the social networking profile of the user from the user profiles store 131.

The online system 130 receives 312 a new content item from a content provider system 115 and stores it in the content store 102*a*. In an embodiment, the content selector 101 sends the new content item to the online system 130 for extracting a new feature vector 410. The feature extraction module 133 extracts 316 a new feature vector 410 including features from the new content item.

The machine learning model 135 generates 320 the demographic criteria vector 136 based on the extracted new feature vector 410. The demographic criteria vector 136 indicates a likelihood of a user with a user profile matching the demographic criteria vector 136 interacting with the new content item exceeding a threshold.

The online system 130 sends 324 information describing the demographic criteria vector 136 to the content provider system 115 for targeting the new content item to an online audience corresponding to the demographic criteria vector 136.

Machine Learning Training Engine

FIG. 4 illustrates an example process for training the machine learning model 135 executed by the machine learning training engine 205. The process includes the use of content items 401, the feature extraction module 133, a feature vector 410, the user profiles store 131, the machine learning model 135, and the user interaction store 134. In some embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step.

The content items 401 are electronic media content items received by the content selector 101 from one or more content provider systems 115. A content provider system 115 may be a provider of sponsored content items such as a political campaign, a university, a corporation, the government, etc. Examples of sponsored content items include online advertisements, etc. Content items may be images, text paragraphs, video clips, audio clips, hyperlinks, online forms, etc. The online system 130 sends the content items 401 to client devices 110 for receiving information associated with user interactions with the content items 401. Alternatively, content items 401 may be displayed on third-party websites and information about past user interactions on the third-party websites may be received by the online system 130 via tracking pixels.

The feature extraction module 133 shown in FIG. 4 extracts a feature vector 410 including features 410*a*, 410*b*, etc., from each content item 401. The feature extraction module 133 receives the content items 401 as input and extracts features 410*a*, 410*b*, etc., intended to be informative and non-redundant, facilitating training of the machine learning model 135. Redundant input data in the content items 401 such as the repetitiveness of images presented as pixels is transformed into a reduced set of features (feature vector 410). The extracted features 410 contain the relevant information from the content items 401 such that the machine learning model 135 is trained by using this reduced representation instead of the complete initial data in the content items 401. The features 410 corresponding to content items 401 are used for training the machine learning model 135 based on past user interactions (stored in the user interaction store 134) with the content items 401, which contain those features. The feature vector 410 may include a feature 410*a* describing an object represented in an image in a content item 401. Image analysis may include analyzing the image to identify the object. Example objects are automobiles, musical instruments, houses, etc. Features are stored in the feature store 203 for training the machine learning model 135.

A feature 410*b* may describe an aggregate value based on a pixel attribute of pixels in the image in a content item 401. Image analysis may include analyzing the image to determine the aggregate value. A pixel attribute may be a value from 0 to 256 that represents the pixel's intensity or color. For example feature 410*b* may represent the average value of the pixel attribute over all the pixels, over only the even-numbered pixels, over only the odd-numbered pixels, or over clusters of pixels. A feature 410*c* may describe an audio pattern occurring in a content item 401. A feature 410*d* may describe a genre of music in an audio clip within a content item 401. In this example, extracting the feature vector includes analyzing an audio clip to recognize audio patterns in a content item 401. In another example, extracting a feature vector includes transcribing an audio clip in a content item 401 to text. A feature 410*e* may represent the digital byte values of an audio signal within a content item 401. In another example, a feature may represent the color of an object in an image within the content item 401. In another example, a feature may represent the brand of product represented by a content item 401. In another example, a feature may represent whether a content item contains an embedded hyperlink.

The machine learning training engine 205 trains the machine learning model 135 shown in FIG. 4 using training sets including information from the user interaction store 134, the feature vector 410, and the user profiles store 131. In embodiments, the machine learning model 135 is thereby configured to receive a feature vector 410 for a content item 401 and generate a demographic criteria vector 136 based on the feature vector 410. The demographic criteria vector 136 indicates a likelihood of a user with a user profile matching the demographic criteria vector 136 interacting with the content item 401 exceeding a threshold. In embodiments, the machine learning model 135 is configured to generate a score for each demographic criterion indicative of a likelihood of a user corresponding to the demographic criterion interacting with a content item 401. In an embodiment, the score is indicative of a predicted click-through rate of the content items 401, such as probabilities that the features 410 have a particular Boolean property, or an estimated value of a scalar property. As part of the training of the machine learning model 135, the machine learning training engine 205 forms a training set of features 410, user profiles, and user interactions by identifying a positive training set of features that have been determined to have the property in question (increased user interactions of a certain demographic criterion), and, in some embodiments, forms a negative training set of features that lack the property in question. In one embodiment, the machine learning training engine 205 applies dimensionality reduction (e.g., via linear discriminant analysis (LDA), principle component analysis (PCA), or the like) to reduce the amount of data in the feature vector 410 to a smaller, more representative set of data.

The machine learning training engine 205 uses machine learning to train the machine learning model 135 shown in FIG. 4, with the feature vectors 410 of the positive training set and the negative training set serving as the inputs. Different machine learning techniques-such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The machine learning model 135, when applied to the feature vector 410 extracted from a content item 401, outputs an indication of whether the content item 401 has the property in question, such as a Boolean yes/no estimate, or a scalar value representing a probability.

In some embodiments, a validation set is formed of additional features, other than those in the training sets, which have already been determined to have or to lack the property in question. The machine learning training engine 205 applies the trained machine learning model 135 shown in FIG. 4 to the features of the validation set to quantify the accuracy of the machine learning model 135. Common metrics applied in accuracy measurement include: Precision=TP/(TP+FP) and Recall=TP/(TP+FN), where precision is how many the machine learning model 135 correctly predicted (TP or true positives) out of the total it predicted (TP+FP or false positives), and recall is how many the machine learning model 135 correctly predicted (TP) out of the total number of features that did have the property in question (TP+FN or false negatives). The F score (F-score=2×PR/(P+R)) unifies precision and recall into a single measure. In one embodiment, the machine learning training engine 205 iteratively re-trains the machine learning model 135 until the occurrence of a stopping condition, such as the accuracy measurement indication that the model is sufficiently accurate, or a number of training rounds having taken place.

Execution of the Machine Learning Model

Figure 5:
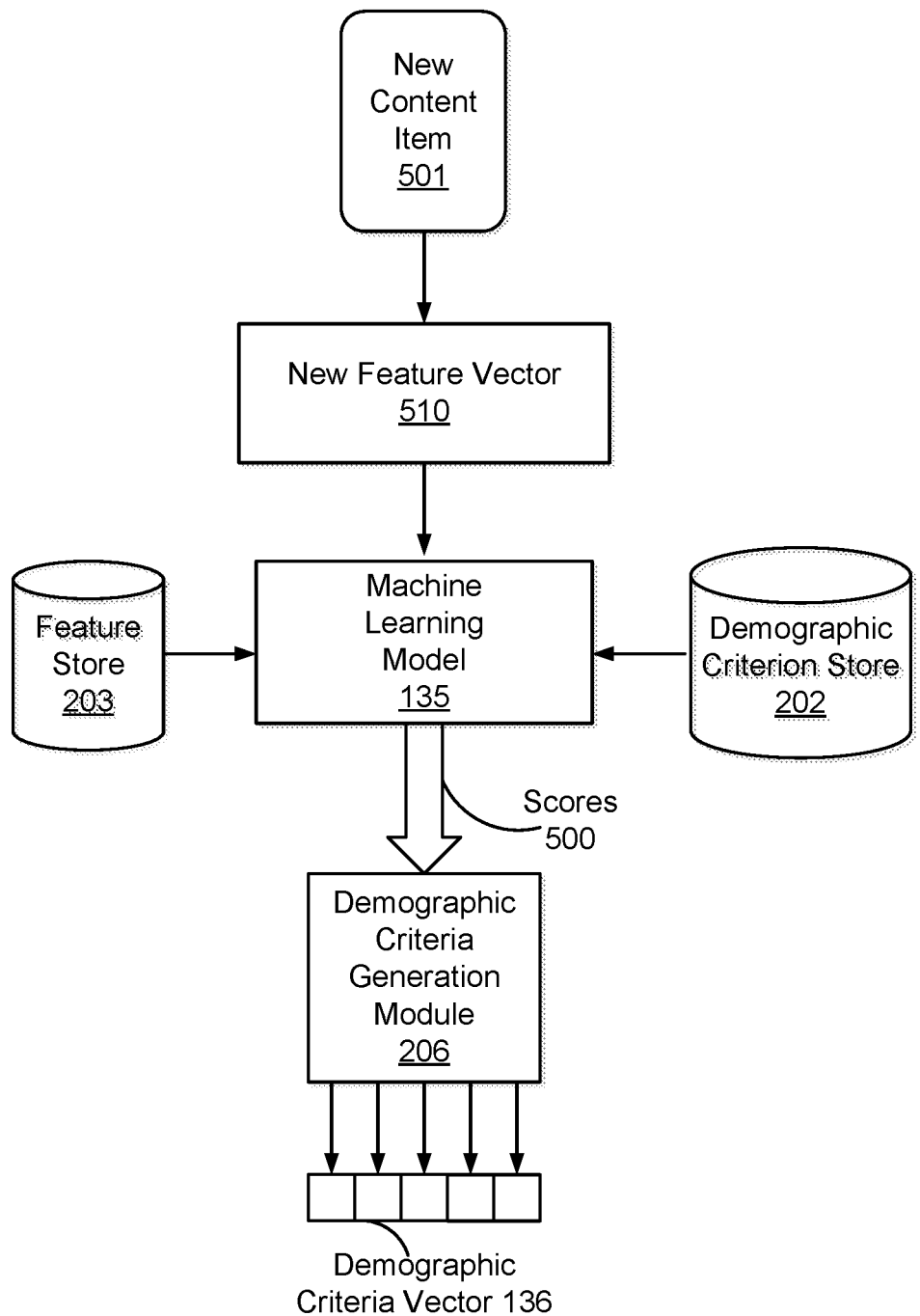
FIG. 5 is an illustration of a process for determining a demographic criteria vector based on the machine learning model, in accordance with an embodiment.

FIG. 5 is an illustration of the process for determining a demographic criteria vector 136 based on the machine learning model 135, in accordance with an embodiment. The execution procedure creates a demographic criteria vector 136 for a new content item 501 that is input to the online system 130. The procedure includes the use of the feature store 203, a new feature vector 510, the machine learning model 135, the demographic criterion store 202, and the demographic criteria generation module 206. In some embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step.

The feature extraction module 133 shown in FIG. 5 extracts a new feature vector 510 of features from the new content item 501 and sends the new feature vector 510 to the machine learning model 135. The machine learning model compares the new feature vector 510 to the features stored in the feature store 203 to generate a score for each demographic criterion in the demographic criterion store 202.

The machine learning model 135 may be configured to optimize the conditional probability that a user will interact with the new content item 501 based on the content item's features. In one embodiment, $P(f_c)$ represents the probability that a given content item c has the feature f. In this embodiment, $P_u(interact_c)$ represents the probability that a user corresponding to demographic criterion u interacts with given content item c. The machine learning model 135 is configured to optimize the sum $\Sigma_c \Sigma_u P_u(interact_c | f_c)$, which represents the sum of conditional probabilities over all demographic criteria and all content items that a user corresponding to demographic criterion u interacts with given content item c, given that content item c has the feature f.

In another embodiment, there may be more than one type of user interaction that is optimized. In this embodiment, $P_u(interact(t)_c)$ represents the probability that a user corresponding to demographic criterion u interacts with given content item c in manner t. The machine learning model 135 is configured to optimize the sum $\Sigma_u \Sigma_t \Sigma_c P_u(interact(t)_c | f_c)$, which represents the sum of conditional probabilities over all users, all content items, and all types of user interactions that that a user corresponding to demographic criterion u interacts in a manner t with given content item c, given that content item c has the feature f.

After a user has clicked on a content item on a webpage of the online system 130, the user may purchase a product related to the content item on a third-party website or a mobile application, or otherwise interact with a third-party website related to the content item. When the user's client device 110 receives a page from the third-party website, a tracking pixel may fire, causing the browser 111 to send information to the online system 130 about the user interactions performed by the user on the third-party website. The online system 130 may also track such user interactions for content items. In one example having two types of interactions ("click" and "purchase a product"), the machine learning model 103 is configured to optimize the sum $\Sigma_u \Sigma_c P_u(purchase_c | click_c) \times P_u(click_c | f_c)$, where $P_u(purchase_c)$ is the probability that a user corresponding to demographic criterion u will purchase the product represented by content item c, $P_u(click_c)$ is the probability that a user corresponding to demographic criterion u will click on content item c, $P_u(\text{purchase}_c | \text{click}_c)$ is the conditional probability that a user corresponding to demographic criterion u will purchase the product represented by content item c given that the clicks on content item c, and $P_u(\text{click}_c | f_c)$ is the is the conditional probability that a user corresponding to demographic criterion u clicks on content item c given that content item c has the feature f. In this example, the machine learning model 135 is configured to optimize the sum of conditional probabilities over all users and all content items that a user corresponding to demographic criterion u will purchase the product represented by content item c given that content item c has the feature f.

The machine learning model 135, having been trained using similar feature sets, is applied to the new feature vector 510. Classifications, binaries, or other scores, based on the new feature vector 510, are determined by the machine learning model 135, according to some embodiments. In one embodiment, a machine learning model 135 determines a classification, binary, or score indicating the predicted user preference for every configurable or customizable attribute of the new content item 501. The machine learning model 135 may send the score associated with each demographic criterion in the demographic criterion store 202 to the demographic criteria generation module 206. The score associated with each demographic criterion indicates a likelihood of a user corresponding to that demographic criterion interacting with the one or more content items associated with that feature.

In another embodiment, the demographic criteria generation module 206 receives the new feature vector 510 based on the new content item 501. The demographic criteria generation module 206 may determine the score for each demographic criterion by evaluating an expression representing a weighted aggregate of scores associated with features 510. In one example, the weight associated with a feature is predetermined, for example, configured by an expert user. Features that are most determinative of increased user interactions with the content items are weighted more. In another example, a feature, e.g., that a content item contains an audio clip of a particular genre of music, is weighted less responsive to determining that the feature is associated with user interactions indicating users did not send the content item to their social networking connections after interacting with the content item. The demographic criteria generation module 206 generates a demographic criteria vector 136 including each demographic criterion from the demographic criterion store 202 whose score exceeds a threshold.

In an embodiment, the demographic criteria vector 136 is presented to a user, for example, an expert for review and approval. The expert user may further revise the demographic criteria vector 136, for example, to make the demographic criteria consistent with policies of a content provider. In an embodiment, the demographic criteria vector 136 is provided to a content publisher or the content selector 101 for use in distributing the content item. Accordingly, the content publisher or the content selector 101 sends information describing the content item to users that match the demographic criteria vector 136.

Alternative Embodiments

The foregoing description of the embodiments have been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments of the is intended to be illustrative, but not limiting, of the scope of the embodiments, which is set forth in the following claims.

What is claimed is:

1. A method comprising:
    storing, by an online system, user profiles of users performing past user interactions with a plurality of content items;
    extracting feature vectors from images in the plurality of content items by applying edge analysis operations to images in the plurality of content items, the edge analysis operations including calculating a gradient of pixel value for one or more pixels and detecting one or more edge pixels based on whether the calculated gradients exceed a gradient threshold;

training a machine learning model using the extracted feature vectors and the user profiles of the users performing the past user interactions as a training set, the machine learning model configured to:
  receive a feature vector comprising a reduced set of different features associated with complete data of a content item; and
  generate a demographic criteria vector, for the content item as output, based on the feature vector, the demographic criteria vector comprising a plurality of scores exceeding a predetermined threshold, each of the scores associated with each of a plurality of demographic criteria, and each of the scores, exceeding the predetermined threshold, indicate a likelihood of a user with a user profile that corresponds to the demographic criteria would interact with the content item;
extracting a new feature vector from an image in a received new content item;
generating, by inputting the new feature vector into the machine learning model, a demographic criteria vector output by the machine learning model for the new content item based on the new feature vector; and
sending the generated demographic criteria vector output for the new content item to a content provider for targeting the users with the new content item.

2. The method of claim 1, wherein features of the extracted feature vectors describe objects represented in the images in the plurality of content items and the edge analysis operations including identifying the objects based on one or more edges defined by the edge pixels.

3. The method of claim 1, further comprising receiving information describing the past user interactions with the plurality of content items from tracking pixels displayed on websites of the online system.

4. The method of claim 1, further comprising receiving information describing the past user interactions with the plurality of content items from tracking pixels displayed on third-party websites.

5. The method of claim 1, wherein demographic criteria used for the demographic criteria vector comprise one or more of ranges of age of users, gender of users, locations associated with users, education of users, or ethnicity of users.

6. The method of claim 1, wherein demographic criteria used for the demographic criteria vector comprise information describing social networking connections of a user, the information describing the social networking connections comprising an aggregate range of ages for other users connected to the user, an aggregate value based on genders of other users connected to the user, or locations of other users connected to the user.

7. The method of claim 1, wherein the reduced set of different features comprises an aggregate value based on pixel attributes associated with the content item.

8. The method of claim 1, wherein the plurality of demographic criteria is associated with one or more determined target users that satisfy one or more of the plurality of demographic criteria.

9. A method comprising:
  storing, by an online system, user profiles of users performing past user interactions with a plurality of content items;
  receiving a new content item;
  extracting a new feature vector from an image in the new content item by applying edge analysis operations, the edge analysis operations including calculating a gradient of pixel value for one or more pixels and detecting one or more edge pixels based on whether the calculated gradients exceed a gradient threshold;
  generating, by inputting the new feature vector into a machine learning model, a demographic criteria vector output by the machine learning model for the new content item based on the new feature vector, the machine learning model trained with a training set of content items with feature vectors extracted by the edge analysis operations and information associated with past user interaction with the training set of content items, the machine learning model configured to:
    receive a feature vector comprising a reduced set of different features associated with complete data of a content item; and
    generate a demographic criteria vector, for the content item as output, based on the feature vector, the demographic criteria vector comprising a plurality of scores exceeding a predetermined threshold, each of the scores associated with each of a plurality of demographic criteria, and each of the scores, exceeding the predetermined threshold, indicate a likelihood of a user with a user profile that corresponds to the demographic criteria would interact with the content item; and
  sending the generated demographic criteria vector output for the new content item to a content provider for targeting users with the new content item.

10. The method of claim 9, wherein a feature of the extracted new feature vector describes an object represented in the image in the new content item and the edge analysis operations including identifying the object based on one or more edges defined by the edge pixels.

11. The method of claim 9, further comprising receiving information describing the past user interactions with the plurality of content items from tracking pixels displayed on websites of the online system.

12. The method of claim 9, further comprising receiving information describing the past user interactions with the plurality of content items from tracking pixels displayed on third-party websites.

13. The method of claim 9, wherein demographic criteria used for the demographic criteria vector comprise one or more of ranges of age of users, gender of users, locations associated with users, education of users, or ethnicity of users.

14. The method of claim 9, wherein demographic criteria used for the demographic criteria vector comprise information describing social networking connections of a user, the information describing the social networking connections comprising an aggregate range of ages for other users connected to the user, an aggregate value based on genders of other users connected to the user, or locations of other users connected to the user.

15. A non-transitory computer-readable storage medium comprising instructions executable by a processor, the instructions comprising instructions for:
  storing, by an online system, user profiles of users performing past user interactions with a plurality of content items;
  receiving a new content item generated by at least one of the online system or a third-party content provider;
  extracting a new feature vector from an image in the new content item by applying edge analysis operations to the image in the new content item, the edge analysis operations including calculating a gradient of pixel value for one or more pixels and detecting one or more edge pixels based on whether the calculated gradients exceed a gradient threshold;

generating, by inputting the new feature vector into a machine learning model, a demographic criteria vector output by the machine learning model for the new content item based on the new feature vector, the machine learning model trained with a training set of content items with feature vectors extracted by the edge analysis operations and information associated with past user interaction with the training set of content items, the machine learning model configured to:

receive a feature vector comprising a reduced set of different features associated with complete data of a content item, and generate a demographic criteria vector, for the content item as output, based on the feature vector, the demographic criteria vector comprising a plurality of scores exceeding a predetermined threshold, each of the scores associated with each of a plurality of demographic criteria, and each of the scores, exceeding the predetermined threshold, indicate a likelihood of a user with a user profile that corresponds to the demographic criteria would interact with the content item; and sending the generated demographic criteria vector, output for the new content item, for targeting users with the new content item.

16. The non-transitory computer-readable storage medium of claim 15, wherein a feature of the extracted new feature vector describes an object represented in the image in the new content item and the edge analysis operations including the object based on one or more edges defined by the edge pixels.

17. The non-transitory computer-readable storage medium of claim 15, wherein demographic criteria used for the demographic criteria vector comprise information describing social networking connections of a user, the information describing the social networking connections comprising an aggregate range of ages for other users connected to the user, an aggregate value based on genders of other users connected to the user, or locations of other users connected to the user.

18. The non-transitory computer-readable storage medium of claim 15, further comprising receiving information describing the past user interactions with the plurality of content items from tracking pixels displayed on websites of the online system.

19. The non-transitory computer-readable storage medium of claim 15, further comprising receiving information describing the past user interactions with the plurality of content items from tracking pixels displayed on third-party websites.

20. The non-transitory computer-readable storage medium of claim 15, wherein demographic criteria used for the demographic criteria vector comprise one or more of ranges of age of users, gender of users, locations associated with users, education of users, or ethnicity of users.

* * * * *